Sept. 5, 1950 S. CHASE 2,521,041
APPARATUS FOR QUANTITATIVE ANALYSIS OF GASES
Filed June 27, 1944 2 Sheets-Sheet 1
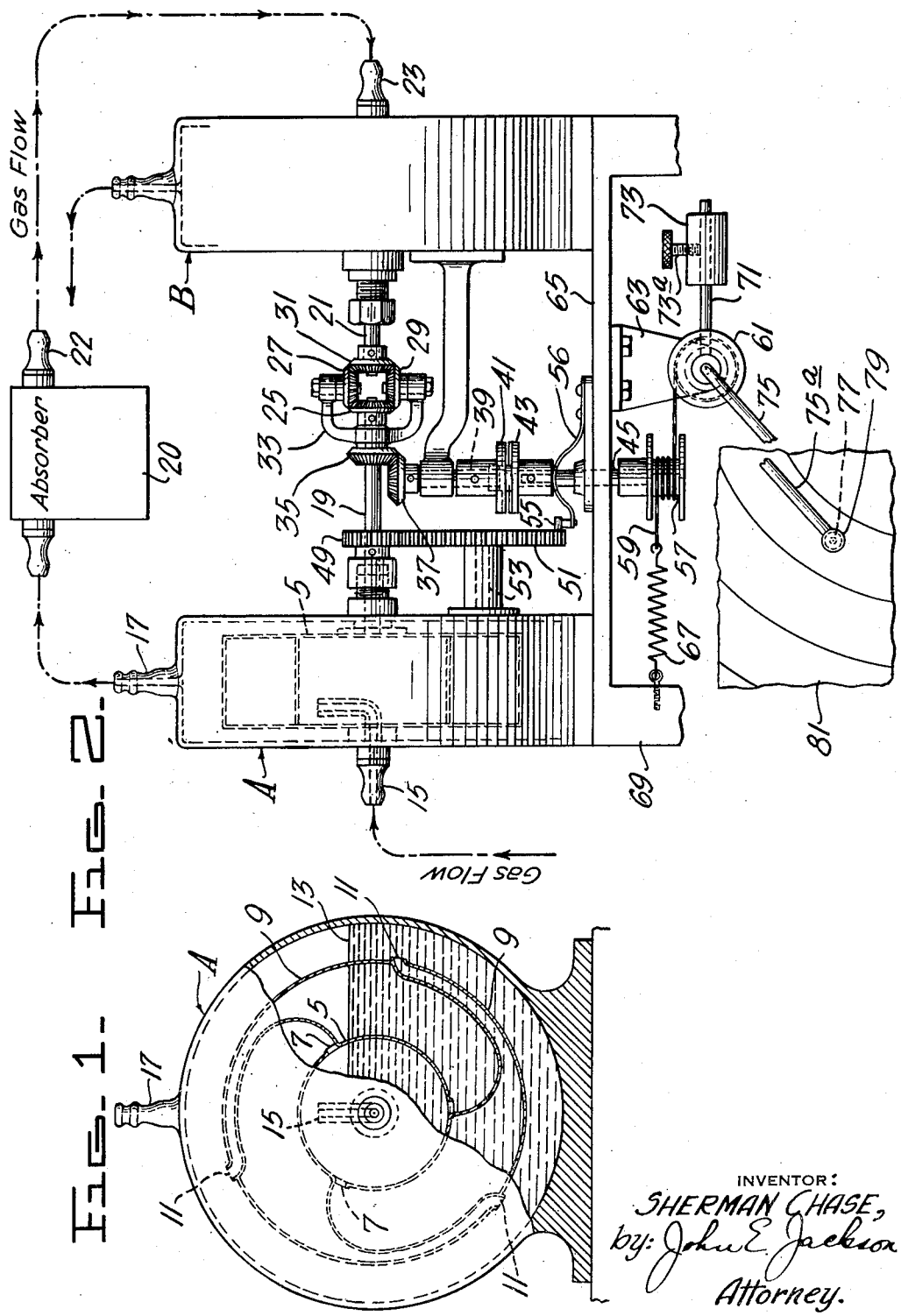
INVENTOR:
SHERMAN CHASE,
by: John E. Jackson
Attorney.

Sept. 5, 1950 S. CHASE 2,521,041
APPARATUS FOR QUANTITATIVE ANALYSIS OF GASES
Filed June 27, 1944 2 Sheets-Sheet 2
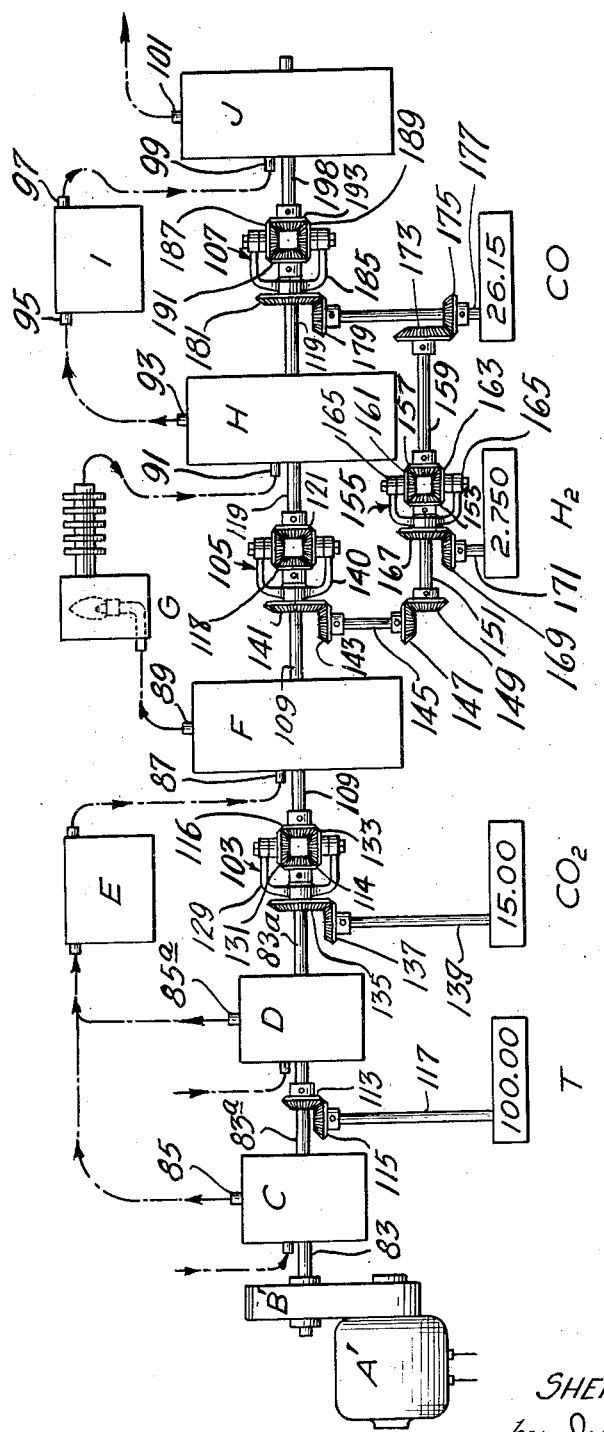
INVENTOR:
SHERMAN CHASE,
by: John E Jackson
Attorney.

Patented Sept. 5, 1950

2,521,041

UNITED STATES PATENT OFFICE 2,521,041

APPARATUS FOR QUANTITATIVE ANALYSIS OF GASES

Sherman Chase, Evergreen Park, Ill., assignor to Carnegie-Illinois Steel Corporation, a corporation of New Jersey Application June 27, 1944, Serial No. 542,383

4 Claims. (Cl. 23—255)

The present invention relates to an improved apparatus for obtaining the analysis of gases of variable composition such as stack gases, fuel gases, process gases and the like, the invention providing an improved apparatus for indicating or recording various amounts or percentages of gases in a mixture of gases of the character indicated above.

The invention will be described in connection with the accompanying drawings, which also afford a detailed understanding of the improved apparatus of the present invention.

In the drawings,

Figure 1 represents an end elevation, partially in section, of a gas meter employed in accordance with the present invention;

Figure 2 is a diagrammatic side elevation of improved apparatus employed in the present invention, the view showing cooperating meters of the type indicated in Figure 1 for enabling the determination to be made; and Figure 3 is a further diagrammatic view of apparatus for carrying out the present invention, the view including the meters of Figure 2, the apparatus of Figure 3 being adapted to determine the amounts of various components in a mixture of gases.

Referring more particularly to the drawings, and first to Figure 1, it will be seen that this view represents a construction of a wet type of volumetric gas meter, in which the rotation of the rotor is proportional to the amount of gas passed through it, although other types of such meters may be employed. In the specifically illustrated form of the apparatus of Figure 1, the meter comprises a housing A, containing a rotating drum 5 having ports 7 therethrough which open into the curvilinear vanes 9 having orifices 11, the meter being sealed with water or other suitable liquid 13. The gas inlet is indicated at 15 and the gas outlet at 17. The view illustrates a conventional type of wet gas meter, two of which are connected as is indicated in Figure 2.

In Figure 2, similar meters A and B have their rotating shafts 19 and 21 revolve on a common center line. Gas is allowed to flow into the meter A through intake 15, causing rotation of rotor 5, and discharges from the meter A through outlet 17 to a chemical absorber indicated at 20. This absorber 20 is connected to the meter B, the outlet 22 of absorber 20 being connected to inlet 23 of the meter B, thereby causing rotation of the rotor thereof.

The meters A and B are so calibrated that equal volumes of gas cause equal rotation of their respective rotor shafts 19 and 21. However, in case the absorber 20 is charged with a caustic solution for the removal of carbon dioxide, then the rotor of the meter B will revolve a less amount, the difference being proportional to the amount of gas absorbed in the absorber 20.

The ends of the shafts 19 and 21 are connected together by conventional differential gearing indicated by 25, 27, 29 and 31. Attached to the gears 27 and 29 are a yoke 33 and a bevel gear 35 which are adapted to rotate about the shaft 19. Bevel gear 35 meshes with a further bevel gear 37 on a vertical shaft 39 to operate a clutch disc 41. This disc 41 is adapted to engage the complementary clutch disc 43, which is mounted on a shaft 45.

When no gas is being absorbed in the absorber 20, the shafts 19 and 21 make the same revolutions and, under this condition, no rotation is imparted to yoke 33 and gear 37. However, when there is a difference in gas volume, rotation of shaft 21 is directly proportional to the amount of gas passing through the meter B, and the rotation of yoke 33 and gear 35 is exactly one-half the difference in rotation of the meters A and B. Likewise, the rotation of the gear 37 and clutch plate 41 is equal to one-half the difference in rotation of the two meters, and, therefore, directly proportional to the amount of gas absorbed in the absorber 20.

Clutch plate 43 is mounted on shaft 45, and is adapted to engage with clutch plate 41 by means of the flat spring 56. Mounted on shaft 19 of meter A is a pinion 49 which meshes with a gear 51 mounted on shaft 53, at a suitable rate of rotation. The gear 51 carries a pin 55 which engages spring 56 to depress the same once for each revolution of the gear 51.

Shaft 45 carries a winch 57 about which is wound a cord 59, one end of this cord being wound about a spool 61 rotatably carried on a bracket 63 secured to the base 65 of the machine.

It will be seen that the clutch plate 41 is so disposed on shaft 39 so that the rotation of the clutch face remains in the same plane. Clutch plate 43 is disposed on shaft 45 so that its face remains in contact with the face of clutch plate 41 when pressure is applied by spring 56. Release of the clutch plates is accomplished by means of the pin 55 rotating with gear 51. The rotation of clutch 43 moves an amount proportional to the difference in rotation of meters A and B, and this motion is transmitted to pen arm 75 through pulleys 57 and 61 by means of the cord 59.

The other end of the cord 59 is attached to one end of a spring 67, the other end of the spring being anchored to a part 69 of the base of the machine. Spring 67 keeps the cord 59 under tension.

The spool 61 is counterbalanced by a rod 71 on which is slidably mounted a weight 73, the adjustment of the weight on the rod 71 being accomplished by a set screw 73a. The spool 61 carries a pen arm (shown broken for considerations of space into sections 75, 75a), the spool rotating on its mounting in conformity with rotation of the winch 57. Mounted on the pen arm is a suitable ink reservoir 77, and a pen 79, for recording on a chart 81, an angular displacement which is proportional to the amount of gas absorbed in the absorber 29 during one revolution of the gear 51.

The above described apparatus of recording the rotation of gear 51 may be employed in connection with other instrumentalities such as quick zero setting counters, electrical devices, and other means familiar to those skilled in the art.

Thus, Figure 3, illustrates such an embodiment, the view illustrating a system of apparatus for determining the various components of a mixture thereof.

In Figure 3, A' represents an electric motor provided with a reducing gear head B' which drives a wet metering pump, similar to previously described meters A and B, the pump C, however, being adapted to pump atmospheric air. The pump C is driven through shaft 83 from the reducing gear B'. This shaft is continued as is indicated at 83a to drive another identical metering pump D, which is used to pump the gas under analysis. Pumps C and D are identical and are driven at the same rate and they supply pressure for forcing the gas-air mixture through the remainder of the apparatus. Pumps C and D discharge through outlets 85, 85a into an absorber E. From absorber E the remaining gas is passed through intake 87 through a meter F of substantially the same construction as described previously. The gas discharges from meter F through outlet 89 to a combination combustion chamber and gas cooler G, which oxidizes the hydrogen and carbon monoxide present and condenses the steam formed by combustion of the hydrogen.

From the unit G, the remaining gas passes through intake 91 of the meter H, which is of the same construction as previously described, then passing from the meter H through outlet 93 through an absorber I by way of inlet 95 and outlet 97, thence into a similar meter J through intake 99, and thence to the atmosphere through outlet 101.

Pump D, and meters F, H and J are connected through differential gearing, indicated generally at 103, 105, and 107 respectively, each of such differential gearing is similar in construction to that described in Figure 2, meters F, H and J being so designed that they will rotate one revolution for one revolution of pumps C and D when there is no absorption or contraction in the gases from pumps C and D.

Pumps C and D rotate in the same direction through the common shaft 83, 83a' and meter H, by reason of its rotor design as will be readily understood, likewise rotates in the same direction as the pumps C and D. The remaining meters F and J rotate in the opposite direction because of rotor design, such direction of rotation being required for desired effect on differential gearing attached to meter shafts.

Mounted on shaft 83a is a bevel gear 113 which meshes with a bevel gear 115 on shaft 117 to drive a counting device indicated diagrammatically at T. Since pumps C and D pass volumes of gas and air proportional to the number of revolutions they make, counter T may be any counting mechanism that registers the number of revolutions made by pumps C and D. For convenience counter T may be calibrated in volumes, each revolution of the two pumps representing one volume of gas and one volume of air introduced to the system.

The shaft 83a extends through to the differential gearing 103, the gear 114 thereof being mounted on this shaft, while gear 116 is mounted on shaft 109. Shaft 109, carries the bevel gear 118 of differential 105, and shaft 119 for the meter H carries the bevel gear 121 of the differential gearing 105 and also the bevel gear 191 of the differential gearing 107. Shaft 198 of meter J carries the bevel gear 193 of the differential gearing 107.

The differential 103 between pump D and meter F comprises a yoke 129 attached to gears 131 and 133, and is also attached to a bevel gear 135 which, in turn, meshes with pinion 137 on shaft 139. This shaft 139 actuates a recording device which may register and/or record the amount of gas, for example, carbon dioxide, which is absorbed in the absorber E.

The differential gearings 105 and 107 are interconnected for measuring amounts of other gases. For this purpose, yoke 140 of differential gearing 105 is attached to bevel gear 141, this latter meshing with bevel pinion 143 on a shaft 145. Shaft 145 also carries a bevel gear 147 which meshes with bevel 149 on shaft 151, this shaft 151 terminating in a bevel gear 153 of a differential gearing 155. This gearing 155 includes also a gear 157 on shaft 159 and upper and lower gears 161 and 163 which are interconnected by a yoke 165 carrying a bevel gear 167 which, in turn, meshes with bevel pinion 169 on recorder operating shaft 171.

Shaft 159 carries bevel gear 173 which meshes with pinion 175 on recorder operating shaft 177, the upper end of which carries the bevel pinion 179 in mesh with gear 181, which is rotatable around the shaft 119 and is connected to yoke 185 of differential gearing 107. Yoke 185 interconnects gears 187 and 189 of the differential gearing, which differential gearing includes also the gear 191 on shaft 119, and gear 193 on shaft 198 of the meter J.

From the foregoing, it will be seen that the motor A' constitutes the source of power for the entire system. The pump C is a wet pump employed to pump atmospheric air. Pump D is an identical pump used to pump the gas under analysis. Pumps C and D discharge air and gas streams which commingle and pass to an absorber E, thence through meter F, thence to the combination combustion chamber and gas cooler G, thence through meter H, thence through absorber chamber I, thence through meter J to the atmosphere. Meters F, H, and J are so designed that they rotate one revolution for one revolution of pumps C and D when there is no absorption or contraction in the gases from pumps C and D. Further, pumps C and D rotate in the same direction by means of their common shaft 83a, and meter H, by reason of its rotor design, rotates in the same direction as pumps C and D. The remaining meters F and J rotate in the opposite direction. Shaft 117 is rotated by like 45° bevel gears 113 and 115. The differential gearings between pump D and meters F, F and H, H and J are similar to the differential gearing described in connection with Figure 2. However, instead of attaining a shaft rotation in shafts 139, 145 and 177 equal to one-half the difference of rotation, these shafts are speeded up by a two to one gear ratio so that their speed of rotation is exactly equal to the differences in revolutions between pump D and meters F, F and H, and H and J.

The operation of the apparatus may be understood still better by reference to the following specific example. Suppose a gas is passed through the apparatus, the gas having the following composition by volume: carbon dioxide 15%; hydrogen 2.75%; carbon monoxide 26.15%; and nitrogen 56.1%. Gas and air are drawn through pumps C and D in equal volumes until counter T registers 100.00 volumes, which represents 100 revolutions by pump D. Since the gas is diluted half and half with air drawn in by pump C, a total of 200 volumes of gas-air mixture enters the system, of which 15 volumes are $CO_2$, 2.75 volumes are $H_2$ and 26.15 volumes are CO. One revolution of pump D is equal in gas volume per revolution to one-half the gas volume per revolution of meters F or H, or J. Absorber E being charged with a caustic solution (for example, a solution of caustic soda) absorbs carbon dioxide in an amount equal to 15 revolutions of pump D, or to 7½ revolutions of meter F, which thus makes 92½ revolutions. The difference in revolutions is transmitted by the differential gearing mechanism to shaft 139. Yoke 129 and gear 135 make a number of revolutions equal to half the difference between the number of revolutions made by shafts 83a and 109, or in the example 3¾ revolutions. The ratio between gears 135 and 137 is shown as 2:1, so that shaft 139 makes a number of revolutions equal to this difference, or in the example 7½ revolutions. To furnish a direct reading preferably counter $CO_2$ is set to register twice the number of revolutions of shaft 139, or in the example 15 revolutions, which is the precise per cent of carbon dioxide in the gas sample. The gas remaining after passing meter F contains hydrogen, carbon monoxide, nitrogen and oxygen. The hydrogen and carbon monoxide are forced to combine with the required oxygen in combustion chamber G where the steam formed by combustion of hydrogen is also condensed, with a related contraction in volume equal to ½ of the carbon monoxide and 3/2 of the hydrogen, which may be expressed in symbols as ½ $CO + 3/2$ $H_2$ and numerically (½×26.15)+(3/2×2.75), which equals 17.2 less revolutions than meter F; and this difference in rotation is transmitted to shaft 145 and thence to shaft 151. The gas leaving meter H contains carbon dioxide formed by burning the original carbon monoxide with oxygen, and this carbon dioxide is absorbed in a caustic solution in absorber I, which results in 26.15 revolutions less in meter J than in meter H.

This difference in revolutions is transmitted to shaft 177, that shaft 177 driving the counter CO, which registers 26.15, which is the per cent of carbon monoxide passed through the apparatus.

Shaft 177 imparts one-half of its revolutions to shaft 159 through gears 175, 173. Shafts 151 and 159 are on the same center line and rotate suitable differential gearing which rotates shaft 171, 2.75 revolutions, which is the precise amount of hydrogen present, which revolutions are registered on counter $H_2$. Shaft 171 is driven 4/3 times the revolutions of the gear and yoke of the differential gearing between shafts 151 and 159.

Expressed numerically, the above relationships are in accordance with the formula:

Revolutions of yoke 155 = ½ (revolution of shaft 151 – revolutions of shaft 159) or, substituting the foregoing numerical values in the formula, it becomes Revolution of shaft $$171 = \frac{1}{2}\left(17.2 - \frac{26.15}{2}\right) \times \frac{4}{3} = 2.75$$

which value is registered on counter $H_2$.

The counters attached to the shafts may be reset manually, or they may be arranged to react automatically by mechanical means after a predetermined period, as is well understood in the art.

Also, the counters may be equipped with raised numerals which automatically print results on a paper strip after a predetermined cycle. Photographic equipment also may be used to record results periodically, manually, or automatically, and the rotation of the shafts may be registered on recorder sheets, strips or charts, all by means well-known to those familiar with the art of metering.

I claim:

1. Apparatus for quantitatively analyzing gases for carbon dioxide, hydrogen and carbon monoxide comprising a pair of metering pumps for introducing measured volumes of gas under analysis and air, a first carbon dioxide absorption means, a first rotary flow meter, conduits for mixing gas and air from said pumps and directing the gas-air mixture to said absorption means and thence to said meter, a first differential operatively connected to the rotary elements of said pumps and said meter and rotatable through a number of revolutions proportional to the difference in revolutions made by the pumps and the meter, this difference being proportional to the carbon dioxide absorbed in said absorption means, means for oxidizing the hydrogen and carbon monoxide in the gas-air mixture, means for cooling the products of combustion, a second rotary flow meter, conduits for directing the gas-air mixture from said first meter to said oxidizing means and thence through said cooling means to said second meter, a second differential operatively connected to the rotary elements of said first and second meters and rotatable through a number of revolutions proportional to the difference in revolutions made by the first and second meters, this difference being proportional to the volume change produced by the oxidation, a second carbon dioxide absorption means, a third rotary flow meter, conduits for directing the gas-air mixture from said second meter to said second absorption means and thence to said third meter, a third differential operatively connected to the rotary elements of said second and third meters and rotatable through a number of revolutions proportional to the difference in revolutions made by the second and third meters, this difference being proportional to the initial carbon monoxide content, and a fourth differential operatively connected to said second and third differentials and rotatable through a number of revolutions proportional to the difference in revolutions made by the second and third differentials, this difference being proportional to the initial hydrogen content.

2. Apparatus for quantitatively analyzing gas for carbon dioxide, hydrogen and carbon monoxide comprising motivating means for introducing measured volumes of gas under analysis and air, a first carbon dioxide absorption means, a first flow meter, conduits for mixing gas and air from said motivating means and directing the gas-air mixture to said absorption means and thence to said meter, a first differential connecting said motivating means and said meter and registering the difference in volume of the gas-air mixture therebetween, this difference being proportional to the carbon dioxide content, means for oxidizing the hydrogen and carbon monoxide in the gas-air mixture, means for cooling the products of combustion, a second flow meter, conduits for directing the gas-air mixture from said first meter to said oxidizing means and thence through said cooling means and to said second meter, a second differential connecting said first and second meters and registering the difference in volume of the gas-air mixture therebetween, a second carbon dioxide absorption means, a third flow meter, conduits for directing the gas-air mixture from said second meter to said second absorption means and thence to said third meter, a third differential connecting said second and third meters and registering the difference in volume of the gas-air mixture therebetween, this difference being proportional to the carbon monoxide content, and a fourth differential connecting said second and third differentials and registering the difference in motivation therebetween, this difference being proportional to the hydrogen content.

3. Apparatus for quantitatively analyzing gas for carbon dioxide, hydrogen and carbon monoxide, comprising a motor and a pair of pumps having a common driving shaft, each pump having an inlet conduit and an outlet conduit, a first absorption means having inlet and outlet conduits, said inlet conduit being connected to said outlet conduits of said pumps, a first rotary flow meter having an inlet conduit connecting the outlet of said absorption means and an outlet conduit, said first flow meter being connected to the shaft of said pumps through a differential gearing, a combustion chamber having an inlet conduit and an outlet conduit, said inlet conduit connecting the outlet conduit of said first flow meter, a second flow meter having inlet and outlet conduits, said inlet conduit being connected to said combustion chamber outlet, a second absorption means having inlet and outlet conduits, said inlet conduit being connected to said second flow meter outlet, a third flow meter having inlet and outlet conduits, said inlet conduit being connected to said second absorption means outlet conduit, said first flow meter and said second flow meter having shafts connected through a second differential gearing, said second and third flow meters having shafts connected through a third differential gearing and a fourth differential gearing connected through gears and shafts to said second and third differential gearing.

4. Apparatus for quantitatively analyzing gas for carbon dioxide, hydrogen and carbon monoxide comprising a pair of pumps, a first carbon dioxide absorption means, conduits connecting the discharges of said pumps with the inlet of said absorption means, a first rotary flow meter, a conduit connecting the discharge of said absorption means with the inlet of said meter, a differential gearing connecting said pumps and said meter, a combustion chamber, a conduit connecting the discharge of said meter with the inlet of said combustion chamber, a second rotary flow meter, a conduit connecting the discharge of said combustion chamber with the inlet of said second meter, a second differential gearing connecting said first and second meters, a second carbon dioxide absorption means, a conduit connecting the discharge of said second meter with the inlet of said second absorption means, a third rotary flow meter, a conduit connecting the discharge of said second absorption means with the inlet of said third meter, a third differential gearing connecting said second and third meters, and a fourth differential gearing connecting said second and third differential gearings.

SHERMAN CHASE.

REFERENCES CITED

The following references are of record in the file of this patent:

UNITED STATES PATENTS

| Number | Name | Date |
|---|---|---|
| 578,003 | Craig | Mar. 2, 1897 |
| 1,700,852 | Packard et al. | Feb. 5, 1929 |
| 1,961,350 | Grunsky | June 5, 1934 |
| 2,001,114 | Schmidt | May 14, 1935 |
| 2,320,310 | Stoddard et al. | May 25, 1943 |

OTHER REFERENCES

Barkley et al. "Instruments for Recording Carbon Dioxide in Flue Gases." Bureau of Mines Bulletin 91, pages 7–10 (1916).

Dennis, "Gas Analysis" MacMillan Co., N. Y., page 135 (1929).